United States Patent
Kline et al.

(10) Patent No.: US 11,293,767 B2
(45) Date of Patent: Apr. 5, 2022

(54) DYNAMIC DROP OFF AND PICK UP OF PASSENGERS VIA AUTONOMOUS VEHICLES

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 16/197,746

(22) Filed: Nov. 21, 2018

(65) Prior Publication Data
US 2020/0158523 A1    May 21, 2020

(51) Int. Cl.
G01C 21/34    (2006.01)

(52) U.S. Cl.
CPC ..... *G01C 21/3438* (2013.01); *G01C 21/3461* (2013.01)

(58) Field of Classification Search
CPC .............. G01C 21/3438; G01C 21/3461
See application file for complete search history.

(56) References Cited

U.S. PATENT DOCUMENTS

| | | | |
|---|---|---|---|
| 7,612,668 B2* | 11/2009 | Harvey | B60R 25/1012 340/550 |
| 9,816,824 B1 | 11/2017 | Racah et al. | |
| 9,972,209 B1* | 5/2018 | Hayward | G05D 1/0223 |
| 2013/0027556 A1* | 1/2013 | Clark | G08B 21/24 348/148 |
| 2015/0369621 A1 | 12/2015 | Abhyanker | |
| 2018/0001870 A1* | 1/2018 | Herman | H04W 4/023 |
| 2018/0128628 A1 | 5/2018 | Cheaz et al. | |
| 2018/0202822 A1 | 7/2018 | Delizio | |
| 2018/0356821 A1* | 12/2018 | Kentley-Klay | G01S 17/87 |
| 2019/0178656 A1* | 6/2019 | Stegall | G01C 21/3415 |
| 2020/0334987 A1* | 10/2020 | Shoval | G06Q 10/02 |

FOREIGN PATENT DOCUMENTS

CN        108417074 A   *   8/2018

* cited by examiner

*Primary Examiner* — Fadey S. Jabr
*Assistant Examiner* — Omar K Morsy
(74) *Attorney, Agent, or Firm* — Cantor Colburn LLP; Tihon Poltavets

(57) ABSTRACT

Generating a virtual fence for vehicles to perform a drop off and a pick up. A drop off location is determined for a first vehicle and a route is determined for the first vehicle to the drop off location. The virtual fence is generated at the drop off location which defines a safe area for performing the drop off and pick up. A boundary of the virtual fence is communicated to at least one other vehicle in proximity of the drop off location. In at least one embodiment, autonomous vehicles perform the drop off and pick up within the virtual fence at the drop off location.

15 Claims, 5 Drawing Sheets

DYNAMIC DROP OFF AND PICK UP OF PASSENGERS VIA AUTONOMOUS VEHICLES

BACKGROUND

The invention relates generally to autonomous vehicles, and more particularly, to dropping off and picking up of passengers via autonomous vehicles.

Autonomous vehicles are already on our roadways. These autonomous vehicles may even have their own dedicated pathways. Soon passengers being dropped off from and picked up with these autonomous vehicles will be commonplace. However, vehicles are not permitted to stop just anywhere in order to pick up or drop off a passenger. Today, drop off and pick up spots are usually off of the roadway on a side road or in a parking lot which increases driving distance or the passenger has to walk part of the way. What is needed is the ability to create a drop-off and pick-up area along the roadway such that no additional driving or walking is required or is minimized.

SUMMARY

According to a non-limiting embodiment, a method for performing a drop-off and pick up is provided. The method includes determining a drop off location for a first vehicle and determining a route for the first vehicle to the drop off location. The method also includes generating a virtual fence at the drop off location, wherein the virtual fence defines a safe area for performing the drop off and pick up, and communicating a boundary of the virtual fence to at least one other vehicle in proximity of the drop off location. Also, the method includes performing a drop off within the virtual fence at the drop off location. In at least one embodiment, the method includes the other vehicle picking up at least one passenger from within the virtual fence.

According to another non-limiting embodiment, a system for generating drop off and pick up locations is provided. The system includes a processor coupled to a memory unit, wherein the processor is configured to execute program instructions for determining a drop off location for a first vehicle and determining a route for the first vehicle to the drop off location. The program instructions also include generating a virtual fence at the drop off location which defines a safe area for performing the drop off and pick up and communicating a boundary of the virtual fence to at least one other vehicle in proximity of the drop off location. Also, the program instructions include performing a drop off within the virtual fence at the drop off location. In at least one embodiment, the program instructions further include determining a route for the other vehicle to the drop off location within the virtual fence and the other vehicle picking up at least one passenger from within the virtual fence.

According to yet another non-limiting embodiment, a computer program product is provided. The computer program product includes a computer readable storage medium having program instructions embodied therewith, the program instructions executable by a computer processor to cause the computer processor to perform a method for performing pick ups and drop offs. The method determining a drop off location for a first vehicle and determining a route for the first vehicle to the drop off location. The method also includes generating a virtual fence at the drop off location, wherein the virtual fence define a safe area for performing the drop off and pick up, and communicating a boundary of the virtual fence to at least one other vehicle in proximity of the drop off location. Also, the method includes performing a drop off within the virtual fence at the drop off location. In at least one embodiment, the method may include determining a route for the other vehicle to the drop off location within the virtual fence and the other vehicle picking up at least one passenger from within the virtual fence.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

Figure 1:
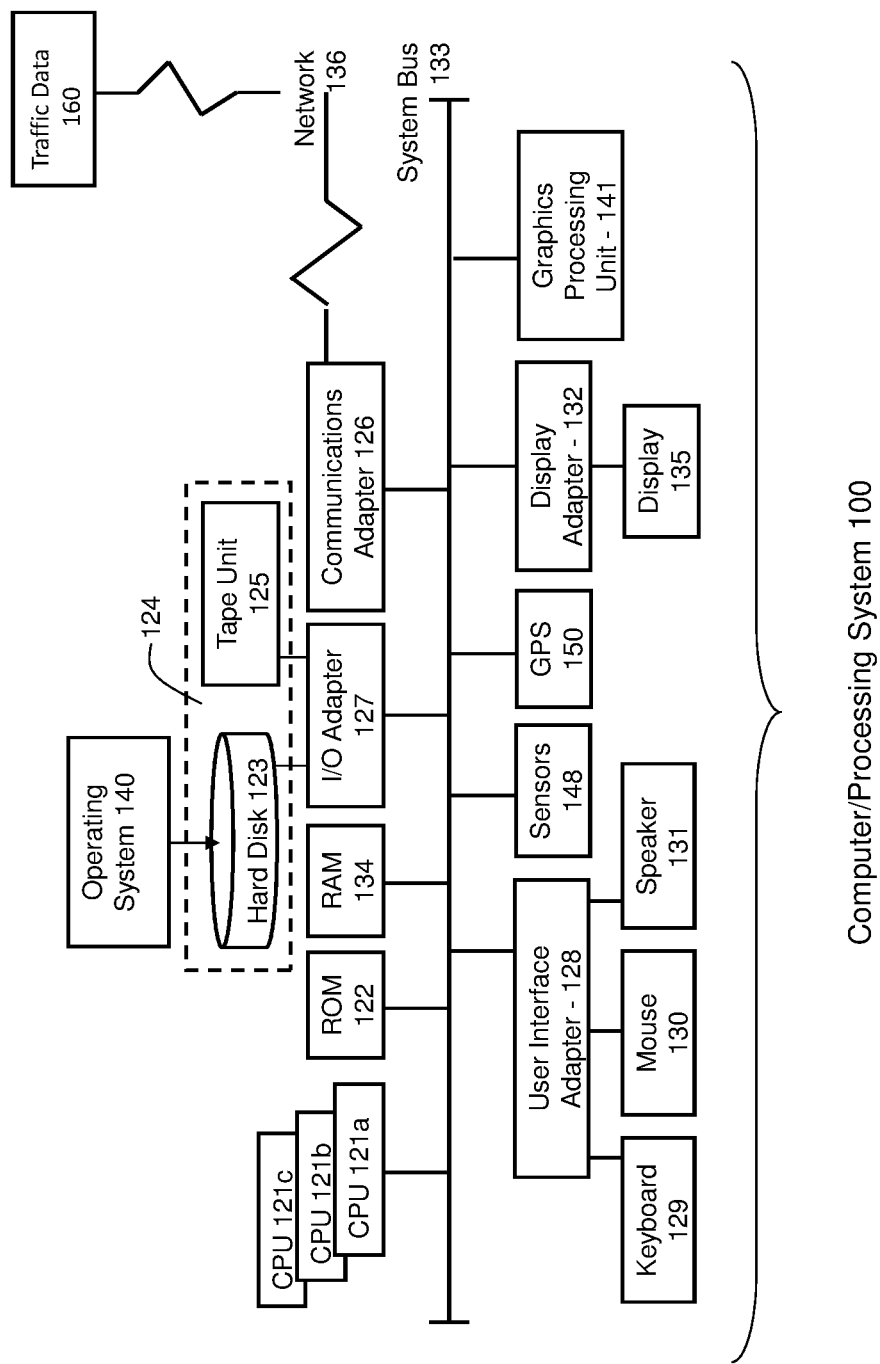
FIG. 1 depicts a block diagram illustrating an exemplary computer processing system that may be utilized to implement exemplary embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, modern navigation systems, along with virtual fencing such as geofencing, allows a vehicle (whether or not having an operator) to sense its environment and navigate or self-drive to one or more selected destinations, avoid or navigate within virtually established boundaries, and reroute, if necessary, from the initial route to avoid traffic or to take detours. Autonomous vehicles utilize a variety of sensors to sense their surroundings, such as radar, computer vision, sonar, GPS, odometry and inertial measurements units. Advanced control systems interpret sensory information to identify navigation paths as well as physical obstacles and virtual fences. As described herein, one or more embodiments address shortcomings of the prior art by utilizing a self-driving navigation system that senses a vehicle's surroundings and generates defined boundaries such as a virtual fence for dropping off and picking up passengers and cargo.

Referring to FIG. 1, there is shown an embodiment of a processing system, commonly referred to as a computer system 100, configured as a vehicular navigation and communication system as well as a virtual area or virtual fence generator and detector, which communicates over a communications network to one or more other vehicular navigation systems or with a central navigation system, for implementing the teachings herein.

The computer system 100 may be implemented as part of a vehicle or as a stand-alone device. The computer system 100 has one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory (RAM) 134 and various other components via a system bus 133. Read only memory (ROM) 122 is coupled to the system bus 133 and may include a basic input/output system (BIOS), which controls certain basic functions of computer system 100.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124.

Operating system 140 for execution on the computer system 100 may be stored in mass storage 124. However, the operating system 140 may also be stored in RAM 134 of the computer system 100. Operating systems useful in planning a route for a convoy of automobiles according to embodiments of the present invention include, for example, UNIX™, Linux™, Microsoft XP™, AIX™, and IBM's i5/OS™.

A network adapter 126 interconnects bus 133 with an outside network 136 enabling the computer system 100 to communicate with other such systems or a central navigation system communicating with other vehicles. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including RAM 134 and mass storage 124, input means such as keyboard 129 and mouse 130, and output capability including speaker 131 and display 135. In one embodiment, a portion of RAM 134 and mass storage 124 collectively store the operating system to coordinate the functions of the various components shown in FIG. 1.

The computer system 100 also includes a variety of sensors 148 to sense a vehicle's surroundings such as radar, computer vision, sonar, GPS 150, odometry and inertial measurements units. Advanced control systems of the computer system 100 interpret sensory information to identify navigation paths as well as obstacles and virtual fences. Virtual areas, virtual perimeters or virtual fences, as in a radius or a set of boundaries around a particular location or obstacle, are dynamically generated or defined by the virtual fencing module 228 (FIG. 2) in combination with the GPS 150. Also, the virtual area or fence may also be generated based on current traffic data provided by the traffic data supplier 160.

The virtual fencing module 228 is triggered in response to when a vehicle or a mobile device approaches, enters or leaves a particular area such as a virtual area or fence. Also, the fencing module 228 triggers communication with an operator of a vehicle utilizing the computer system 100 or some other vehicle also utilizing a separate computer system 100 as a navigation system and for detecting virtual fences. In one or more embodiments, radio frequency identification (RFID) technology may be used instead of or in addition to the GPS 150.

Figure 2:
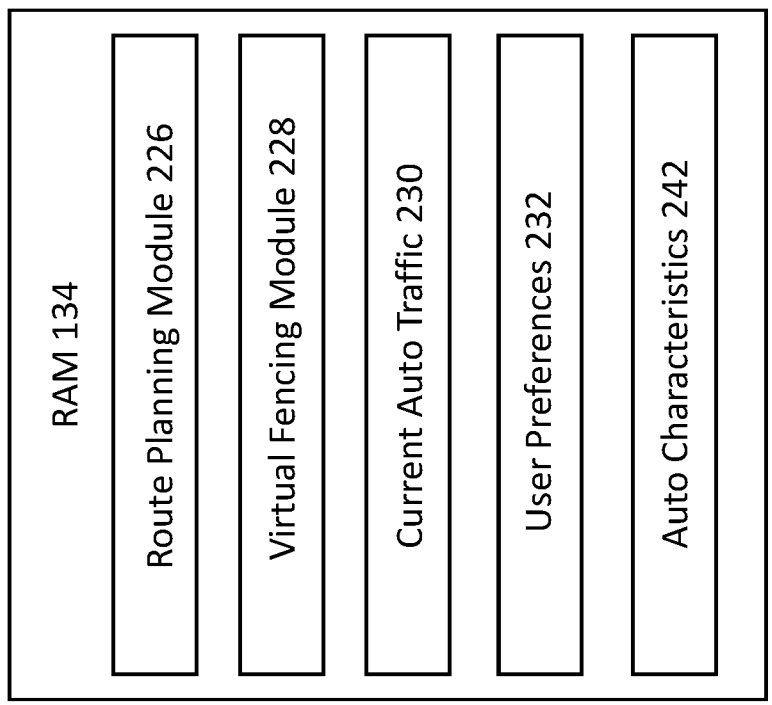
FIG. 2 depicts a block diagram illustrating an exemplary random access memory of the computer processing system of FIG. 1 according to one or more embodiments of the present invention.

Referring to FIG. 2, stored in RAM 134 is a route planning module 226 of computer program instructions for planning routes for a vehicle between an origin and a destination based on a location of the vehicle and a destination selected by the user/operator of the vehicle. The route planning module 226 supports planning an initial route from an origin to a destination depending upon current automobile traffic 230 between the origin and the destination. In one or more embodiments, one or more virtual fences may be destinations or may be one or more stops along the route to one or more destinations.

The route may also depend on vehicle or automobile characteristics 242 and any operator or user preferences 232. Also, the size and location of a virtual area or fence may depend on the vehicle's characteristics as well as the user's preferences 232. For example, whether a vehicle is autonomous, the size of the vehicle, and whether there are any passengers or cargo, are examples of characteristics that may affect the route as well as the size and location of any virtual fence. Moreover, the boundaries, size or shape of the virtual area or fence may be based on the number of passengers that will need to wait within the virtual area or fence, predicted duration of wait at the pick up location defined by the virtual fence, weather conditions, traffic conditions, and the existence of any other virtual fences or areas in the pathways. For example, the boundary of the virtual fence may be determined based on the number of passengers to drop off at the drop off location.

Once the route is planned, the route planning module 226 may report the route to the traffic data supplier 160. A route planning module 226 of one or more other vehicles may then receive one or more routes from the traffic data supplier 160. Data from the traffic data supplier 160 may be used to reroute a vehicle off of an initial route to a particular destination and onto an alternative route. In one or more embodiments, one or more virtual fences are communicated to one or more vehicles via the traffic data supplier 160, directly from another vehicle initiating the generation of the virtual fence, and/or a central navigation system. A vehicle's location along a route and entering or exiting a virtual fence is tracked using the sensors 148 and the GPS 150 and then reported to the central navigation system and/or the traffic data supplier 160. Vehicles approaching a virtual fence that are not performing a drop off or pick up are stopped or routed away from the virtual fence via an alternate route.

Figure 3:
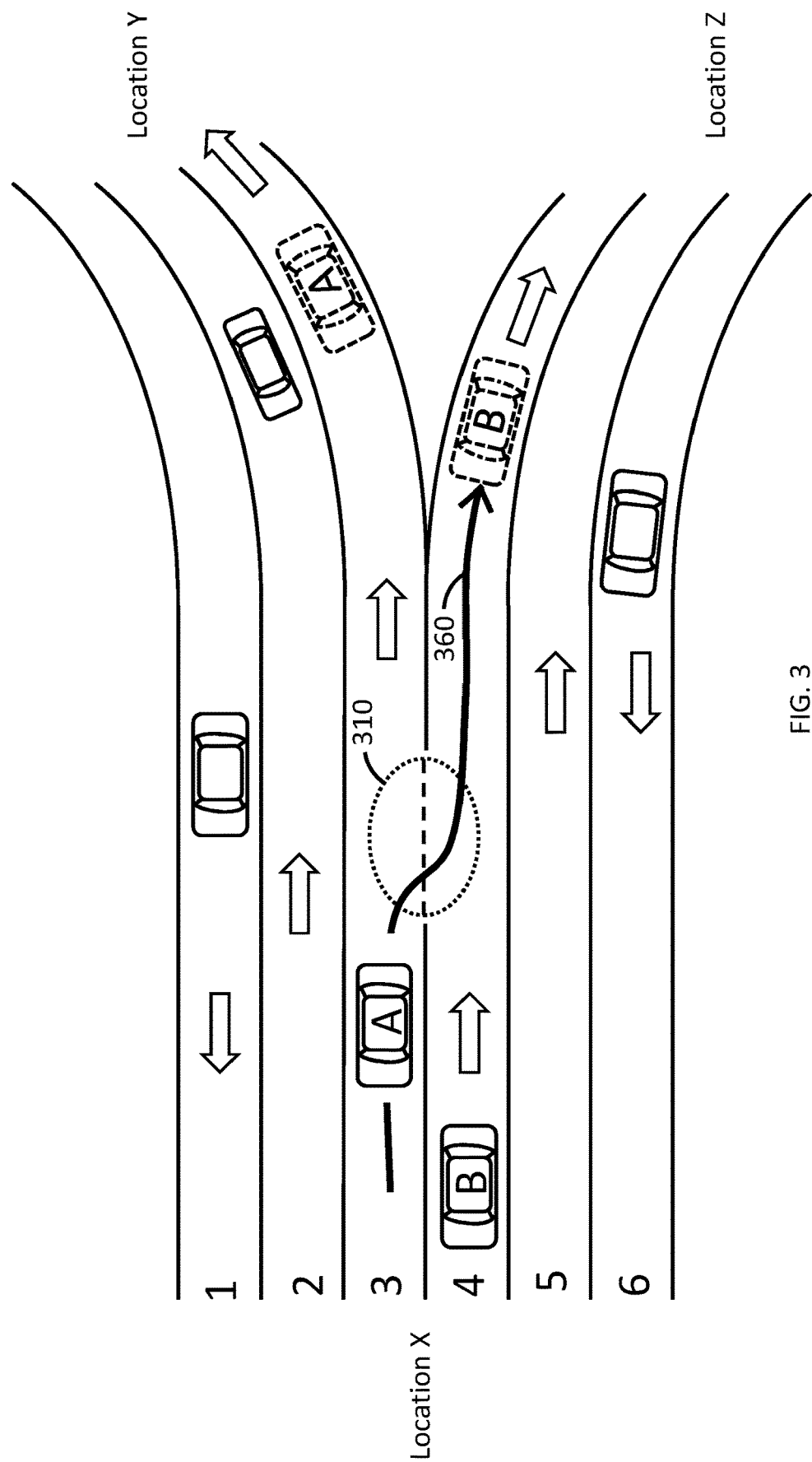
FIG. 3 illustrates a scenario for dropping off and/or picking up one or more passengers or cargo from within a virtual fence when connecting vehicles are driving in the same direction in adjacent pathways.

Referring now to FIG. 3, six different lanes of traffic or pathways are depicted. Each pathway has a direction of travel as indicated but the direction of travel of one or more pathways may change at times. For example, in a completely autonomous environment one or more of the pathways may easily change directions of travel even when autonomous vehicles are in adjacent pathways or in close proximity with one another as a result of the autonomous vehicles communicating with one another.

In the exemplary embodiment of FIG. 3, vehicle A and vehicle B are traveling in adjacent pathways in the same direction and vehicle A is traveling from location X to location Y and vehicle B is traveling from location X to location Z. One or both of the vehicles A and B may be autonomous vehicles. Also, for the scenario depicted in FIG. 3, vehicle A may be carrying one or more passengers or cargo to be dropped off. A computer system 100 of one or both of the vehicles A and B generates a virtual fence 310 defining an area for vehicle A to perform a drop off and vehicle B to perform a pick up. Other vehicles are prevented from crossing the virtual fence and from entering the drop off and pick up location.

In order to generate the virtual fence 310, the route planning module 226, the virtual fencing module 228 and GPS 150 of the computer system 100 take into account the speed, direction, and location of the vehicles A and B and the surrounding traffic. In at least one embodiment, vehicles A and B are connecting vehicles in that the vehicles A and B converge upon the virtual fence 310 at approximately the same time or within a desired time period in order to perform a drop off and a pick up of passengers and/or cargo. Thus, routes are determined to the drop off or pick up location for vehicles A and B. The route of one or both of the vehicles A and B may be adjusted in order to navigate to the drop off or pick up location. Preferably, a convergence point for the two vehicles is determined so that the two vehicles enter the virtual fence at approximately the same time to perform the drop off and pick up.

In one or more embodiments, at least a portion of the virtual fence 310 is generated in at least one vehicle pathway or at least a portion of the virtual fence is generated in adjacent vehicle pathways. In FIG. 3, the virtual fence 310 is centered along the line between adjacent pathways 3 and 4.

However, in one or more other embodiments, the virtual fence 310 may be positioned elsewhere and shaped differently in order to minimize driving distance away from their initial route on a designated pathway and to minimize any walking distance as a result of being dropped off and/or picked up. Also, a route of one or more other vehicles may be adjusted to avoid the drop off location within the virtual fence 310.

A passenger being dropped off in virtual fence 310 by vehicle A and then picked up in virtual fence 310 by vehicle B simply has to step out of vehicle A and into vehicle B. Preferably, when generating the virtual fence 310, the location, position and size of the virtual fence 310 is taken into account such that both the vehicles A and B reach or enter the virtual fence at about the same time. As shown in FIG. 3, the path of the passenger in vehicle A is approaching the virtual fence 310 in pathway 3, stepping out of vehicle A and into vehicle B, and then departing the area of the virtual fence 310 in vehicle B in pathway 4, is shown by arrow 360. After the drop off, the pick up, and departing the area of the virtual fence 310, the vehicles A and B are then shown in phantom in order to indicate the vehicles later in time.

Figure 4:
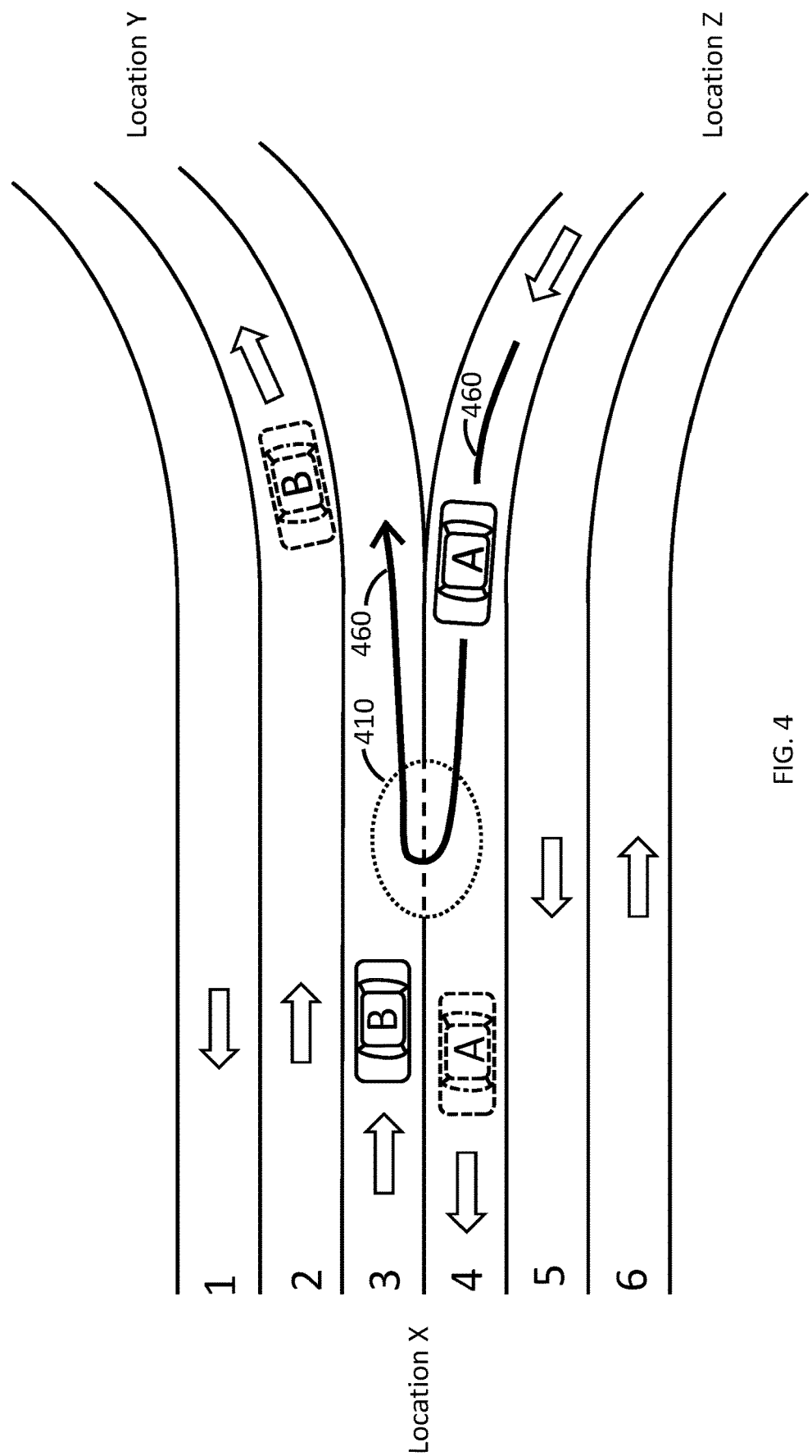
FIG. 4 illustrates an alternative scenario for dropping off and/or picking up one or more passengers or cargo from within a virtual fence when connecting vehicles are driving in different directions in adjacent pathways.

FIG. 4 illustrates an alternative scenario for dropping off and/or picking up of one or more passengers or cargo from a virtual fence 410. In FIG. 4, the vehicles A and B are driving in different directions in adjacent pathways in order to converge at the virtual fence 410. In particular, vehicle A is traveling from location Z toward location X while approaching the virtual fence 410 in pathway 4. Vehicle B is traveling from location X toward location Y while approaching the virtual fence 410 in pathway 3.

Upon vehicle A reaching or entering the virtual fence 410, the passenger can be dropped off from vehicle A and then picked up by vehicle B within the virtual fence 410. Following the drop off and pick up within virtual fence 410, the passenger in vehicle B is then traveling in the opposite direction compared to before the drop off in the virtual fence 410. In particular, as shown in FIG. 4, the path of the passenger approaching the virtual fence 410 in vehicle A in pathway 4, stepping out of vehicle A and into vehicle B, departing the area of the virtual fence 410 in vehicle B, and then vehicle B changing lanes from pathway 3 to pathway 4, is shown by arrow 460. After the drop off/pick up and departing the area within the virtual fence 410, vehicles A and B are shown in phantom in order to indicate the vehicles later in time. In one or more embodiments, a vehicle may be provided a route to a virtual fence to perform a drop off or pick up where the route to the virtual fence includes one or more lane changes. For example, an autonomous vehicle could change lanes automatically in order to navigate to a virtual fence or virtual area.

Figure 5:
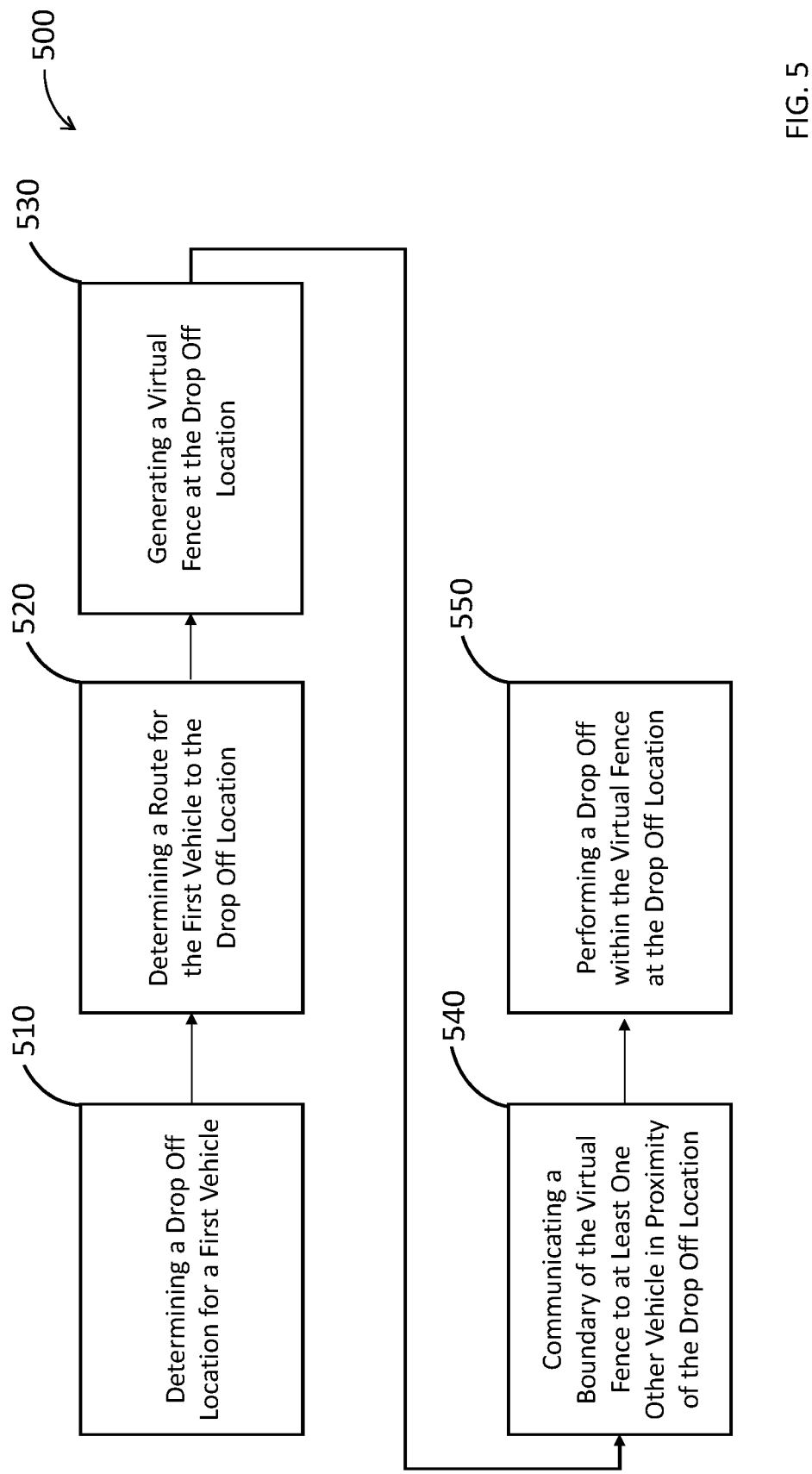
FIG. 5 is a flow diagram illustrating a method for performing a drop off and pick up according to one or more embodiments of the present invention.

Turning to FIG. 5, one or more embodiments may include a method 500 for generating a drop off location. The flow diagram of FIG. 5 illustrates the method 500 that includes process block 510 for determining a drop off location for a first vehicle and process block 520 for determining a route for the first vehicle to the drop off location. The method 500 also includes process block 530 for generating a virtual fence at the drop off location and process block 540 for communicating a boundary of the virtual fence to at least one other vehicle in proximity of the drop off location. Process block 550 includes performing a drop off within the virtual fence at the drop off location.

In one or more embodiments, the method 500 may also include adjusting a route of the other vehicle to avoid the drop off location within the virtual fence. Alternatively, one or more embodiments of the method 500 may include determining a route for the other vehicle to the drop off location within the virtual fence and the other vehicle picking up at least one passenger from within the virtual fence. The method 500 may also include the other vehicle picking up cargo from within the virtual fence. In one or more embodiments, the method 500 may include generating at least a portion of the virtual fence within the road or in a pathway for vehicles or generating at least a portion of the virtual fence in adjacent pathways for vehicles. Method 500 may also include determining the boundary of the virtual fence based on a number of passengers to drop off at the drop off location. The method 500 may include determining a convergence point for the first vehicle and the other vehicle and also the first vehicle and the other vehicle entering the virtual fence at approximately the same time to perform the drop off and pick up.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing a drop off and pick up, comprising:

determining a drop off location for a first vehicle;

determining a route for the first vehicle to the drop off location;

generating a virtual fence at the drop off location, wherein the virtual fence defines a safe area during a desired time period for performing the drop off and pick up and wherein a size of an area bounded by the virtual fence is based on a number of passengers to drop off at the drop off location;

communicating a boundary of the virtual fence to at least one other autonomous vehicle in proximity of the drop off location, wherein the boundary of the virtual fence prevents the at least one other autonomous vehicle from entering the safe area during the time period; and performing, by the first vehicle, the drop off within the virtual fence at the drop off location, wherein the first vehicle is an autonomous vehicle.

2. The method of claim 1 wherein the at least one other autonomous vehicle is a second vehicle navigating to the drop off location and a third vehicle routed to avoid the drop off location within the virtual fence.

3. The method of claim 1 further comprising determining a route for the other vehicle to the drop off location within the virtual fence.

4. The method of claim 3 further comprising the other autonomous vehicle picking up at least one passenger from within the virtual fence.

5. The method of claim 3 further comprising the other autonomous vehicle picking up cargo from within the virtual fence.

6. The method of claim 1 wherein generating a virtual fence at the drop off location comprises generating at least a portion of the virtual fence in a pathway for vehicles.

7. The method of claim 6 wherein at least a portion of the virtual fence is generated in adjacent pathways for vehicles.

8. The method of claim 1 wherein determining the drop off location comprises determining a convergence point for the first vehicle and the other autonomous vehicle.

9. A system for generating drop off and pick up locations, the system comprising:

a processor coupled to a memory unit, wherein the processor is configured to execute program instructions comprising:

determining a drop off location for a first vehicle;

determining a route for the first vehicle to the drop off location;

generating a virtual fence at the drop off location, wherein the virtual fence defines a safe area during a desired time period for performing the drop off and pick up and wherein a size of an area bounded by the virtual fence is based on a number of passengers to drop off at the drop off location;

communicating a boundary of the virtual fence to at least one other autonomous vehicle in proximity of the drop off location, wherein the boundary of the virtual fence prevents the at least one other autonomous vehicle from entering the safe area; and performing, by the first vehicle, the drop off within the virtual fence at the drop off location, wherein the first vehicle is an autonomous vehicle.

10. The system of claim 9 wherein execution of the program instructions further comprises determining a route for the other autonomous vehicle to the drop off location within the virtual fence and the other autonomous vehicle picking up at least one passenger from within the virtual fence.

11. The system of claim 9 wherein generating a virtual fence at the drop off location comprises generating at least a portion of the virtual fence in a pathway for vehicles.

12. A computer program product comprising a non-transitory computer readable storage medium having program instructions embodied therewith, the program instructions executable by a computer processor to cause the computer processor to perform a method for performing pick ups and drop offs, comprising:

determining a drop off location for a first vehicle;

determining a route for the first vehicle to the drop off location;

generating a virtual fence at the drop off location, wherein the virtual fence defines a safe area during a desired time period for performing the drop off and pick up and wherein the boundary of the virtual fence is based on a number of passengers to drop off at the drop off location;

communicating a boundary of the virtual fence to at least one other autonomous vehicle in proximity of the drop off location, wherein a size of an area bounded by the virtual fence prevents the at least one other autonomous vehicle from entering the safe area; and performing, by the first vehicle, the drop off within the virtual fence at the drop off location, wherein the first vehicle is an autonomous vehicle.

13. The computer program product of claim 12 further comprising determining a route for the other autonomous vehicle to the drop off location within the virtual fence.

14. The computer program product of claim 12 further comprising the other autonomous vehicle picking up at least one passenger from within the virtual fence.

15. The computer program product of claim 12 further comprising wherein generating a virtual fence at the drop off location comprises generating at least a portion of the virtual fence in a pathway for vehicles.

* * * * *